US009200832B2

(12) United States Patent
Yoshimura

(10) Patent No.: US 9,200,832 B2
(45) Date of Patent: Dec. 1, 2015

(54) AIR-CONDITIONING APPARATUS

(71) Applicant: Kiyoshi Yoshimura, Tokyo (JP)

(72) Inventor: Kiyoshi Yoshimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 336 days.

(21) Appl. No.: 13/847,016

(22) Filed: Mar. 19, 2013

(65) Prior Publication Data
US 2014/0026604 A1    Jan. 30, 2014

(30) Foreign Application Priority Data

Jul. 24, 2012 (JP) ................................. 2012-163939

(51) Int. Cl.
*F25D 29/00*    (2006.01)
*F24F 1/00*     (2011.01)
*F24F 11/00*    (2006.01)

(52) U.S. Cl.
CPC .............. *F25D 29/00* (2013.01); *F24F 1/0003* (2013.01); *F24F 11/0012* (2013.01); *F24F 11/0034* (2013.01); *F24F 11/0079* (2013.01); *F24F 2001/0037* (2013.01); *F24F 2011/0035* (2013.01); *F24F 2011/0064* (2013.01); *F24F 2011/0075* (2013.01); *Y02B 30/746* (2013.01)

(58) Field of Classification Search
CPC .. F25D 29/00; F24F 11/0012; F24F 11/0034; F24F 11/0079; F24F 2011/0012; F24F 2011/0035; F24F 2011/0064; F24F 2011/0075; Y02B 30/746
USPC ..................... 62/180, 186; 165/237
See application file for complete search history.

(56) References Cited

U.S. PATENT DOCUMENTS 5,857,906 A * 1/1999 Cho .............................. 454/229
2012/0067073 A1 3/2012 Huang

FOREIGN PATENT DOCUMENTS

| CN | 101639272 A | 2/2010 |
| JP | H06-129697 A | 5/1994 |
| JP | H06-307695 A | 11/1994 |
| JP | 07-158933 A | 6/1995 |

(Continued)

OTHER PUBLICATIONS

Extended European Search Report issued Oct. 31, 2013 in the corresponding EP Application No. 13166706.5-1602 (English translation).
Office Action issued Nov. 4, 2014 in the corresponding JP Application No. 2012-163939 (with English translation).

(Continued)

*Primary Examiner* — Marc Norman
(74) *Attorney, Agent, or Firm* — Posz Law Group, PLC

(57) ABSTRACT

While cooling operation is continued, a compressor is stopped when a detection temperature Tm reaches a control temperature Tc that is a lower temperature than a set temperature Ts only by a bias temperature $\Delta Tb$, and rotation of a turbofan is stopped if a human body is not present in a room R, or the rotation of the turbofan is continued and a value of the detection temperature Tm is corrected to a correction detection temperature Ta that is a lower temperature than the detection temperature Tm only by a predetermined temperature correction amount $\Delta Tm$. While the correction detection temperature Ta is a temperature that is equal to or lower than the set temperature Ts (the control temperature Tc for prevention of hunting) ($Ta=Tm-\Delta Tm \leq Tc$), the rotation of the turbofan is continued as long as a person is present in the room R, and thermo ON is resumed if the correction detection temperature Ta exceeds the set temperature Ts ($Ta>Ts$).

4 Claims, 4 Drawing Sheets

(56) References Cited

FOREIGN PATENT DOCUMENTS

| | | |
|---|---|---|
| JP | 09-042756 A | 2/1997 |
| JP | 2000-241009 A | 9/2000 |
| JP | 2004-150731 A | 5/2004 |
| JP | 2005-214433 A | 8/2005 |
| JP | 2012-007779 A | 1/2012 |

OTHER PUBLICATIONS

Office Action issued Aug. 13, 2014 in the corresponding AU Application No. 2013203021.
Office Action mailed Jun. 2, 2015 issued in corresponding JP patent application No. 2012-163939 (and English translation).
Chinese Office Action issued on Jun. 30, 2015 in the corresponding CN application No. 201310182406.1( English translation attached).

* cited by examiner

AIR-CONDITIONING APPARATUS

TECHNICAL FIELD

The present invention relates to an air-conditioning apparatus.

BACKGROUND ART

When a conventional air-conditioning apparatus performs, for example, cooling operation, the air-conditioning apparatus executes thermo ON operation that adjusts a room temperature by operating a compressor if an actually measured temperature of indoor air is higher than a set temperature, and thermo OFF operation that stops the compressor if the actually measured temperature is lower than the set temperature; and a fan of an indoor unit is continuously operated in order to increase cool feeling even in the thermo OFF operation. Accordingly, since power consumption is large, an air-conditioning apparatus that reduces the power consumption and provides comfortableness is suggested (for example, see Patent Literature 1).

CITATION LIST

Patent Literature

[Patent Literature 1] Japanese Unexamined Patent Application Publication No. 2012-7779 (pages 9 to 10, FIG. 3)

SUMMARY OF INVENTION

Technical Problem

The air-conditioning apparatus disclosed in Patent Literature 1 includes a temperature sensor that detects an indoor temperature, and a humidity sensor that detects an indoor humidity. While the cooling operation is performed, in the thermo OFF operation that stops the compressor if the actually measured temperature is lower than the set temperature, control that stops an indoor fan or control that decreases a rotation speed of the indoor fan is executed if the indoor humidity detected by the humidity sensor is lower than a set humidity, or control that continues operation of the indoor fan is executed if the indoor humidity detected by the humidity sensor is higher than the set humidity.

That is, the conventional air-conditioning apparatus repeats the thermo OFF operation and the thermo ON operation based on comparison between the actually measured temperature and the set temperature. Hence, there is a demand of reducing the power consumption of the compressor by increasing a time of the thermo OFF operation. Also, when cooling air blows on a human body, a sensible temperature of the human body is decreased. Hence, a person may feel that the cooling is excessive immediately after the thermo ON operation is resumed.

Also, since the operation of the indoor fan is controlled based on the comparison between the actually measured humidity and the set humidity, even if a person (a user) is not present in the room, the air is sent (the operation of the indoor fan is continued). There has been a problem in which the power of the indoor fan is consumed wastefully.

The present invention is made to respond to the above-described demand and to address the above-described problem. An object of the present invention is to provide an air-conditioning apparatus that can realize a comfortable cooled environment and eliminate the waste in the power consumption of the compressor and the indoor fan.

Solution to Problem

An air-conditioning apparatus according to the present invention includes an outdoor unit housing a compressor, an outdoor heat exchanger, and an expansion valve each of which executes a part of a refrigeration cycle; an indoor unit housing an indoor heat exchanger that executes part of the refrigeration cycle; an indoor fan housed in the indoor unit, the indoor fan sucking indoor air that is air in a room in which the indoor unit is installed and supplying the indoor air to the indoor heat exchanger, and blowing the indoor air that has passed through the indoor heat exchanger into the room; indoor-air temperature detecting means for detecting a temperature of the indoor air; human-body presence detecting means for detecting presence of a human body in the room; indoor-air temperature setting means for setting a temperature of the indoor air; and control means for controlling the refrigeration cycle and the indoor fan, based on a detection temperature that is the temperature of the indoor air detected by the indoor-air temperature detecting means, human-body information detected by the human-body presence detecting means, and a set temperature that is the temperature of the indoor air set by the indoor-air temperature setting means. When the indoor heat exchanger functions as an evaporator, the control means stops the refrigeration cycle if the detection temperature is lower than the set temperature, and stops the indoor fan if the human-body information indicates that the human body is not present, or operates the indoor fan if the human-body information indicates that the human body is present.

Advantageous Effects of Invention

The air-conditioning apparatus according to the present invention stops the refrigeration cycle if the detection temperature is lower than the set temperature (equivalent to the thermo OFF operation), detects the presence of the human body in the room, and stops the indoor fan if the human body is not present. Accordingly, the waste in the power consumption of the indoor fan can be eliminated.

DESCRIPTION OF EMBODIMENTS

Embodiment 1

Figure 1:
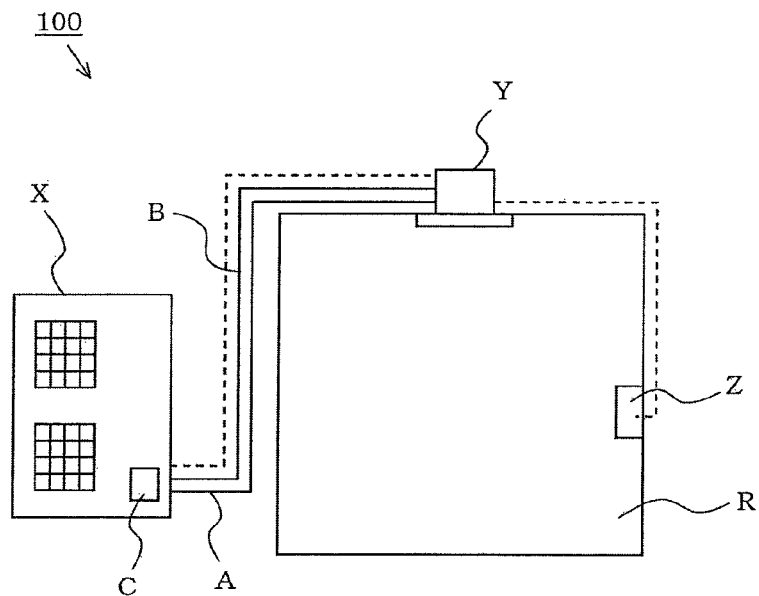
FIG. 1 is a configuration diagram showing a general configuration of an air-conditioning apparatus according to Embodiment 1 of the present invention.
Figure 2:
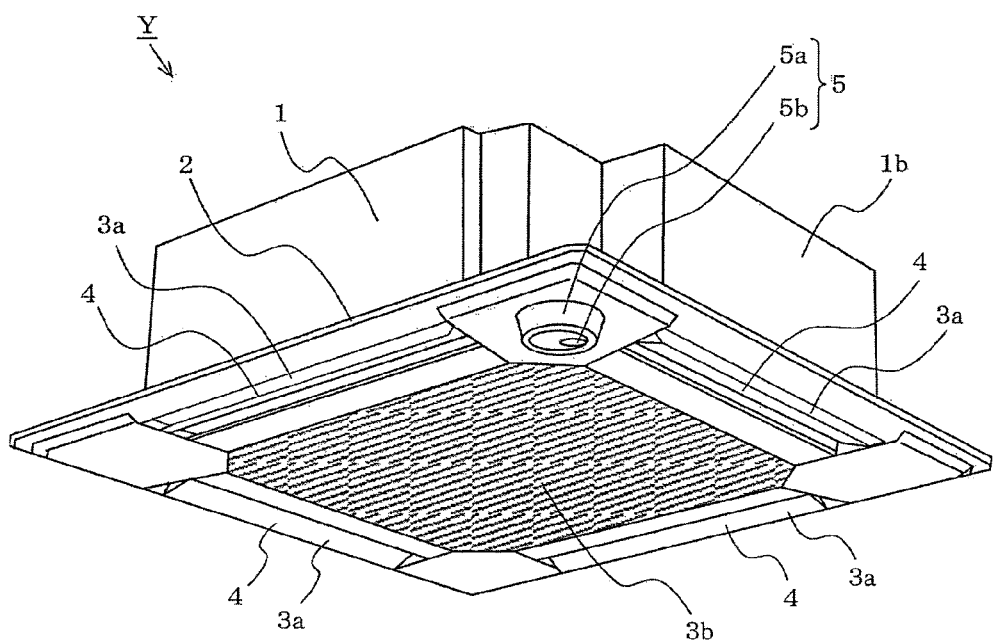
FIG. 2 is a perspective view showing a part (an indoor unit) of the air-conditioning apparatus shown in FIG. 1.
Figure 3:
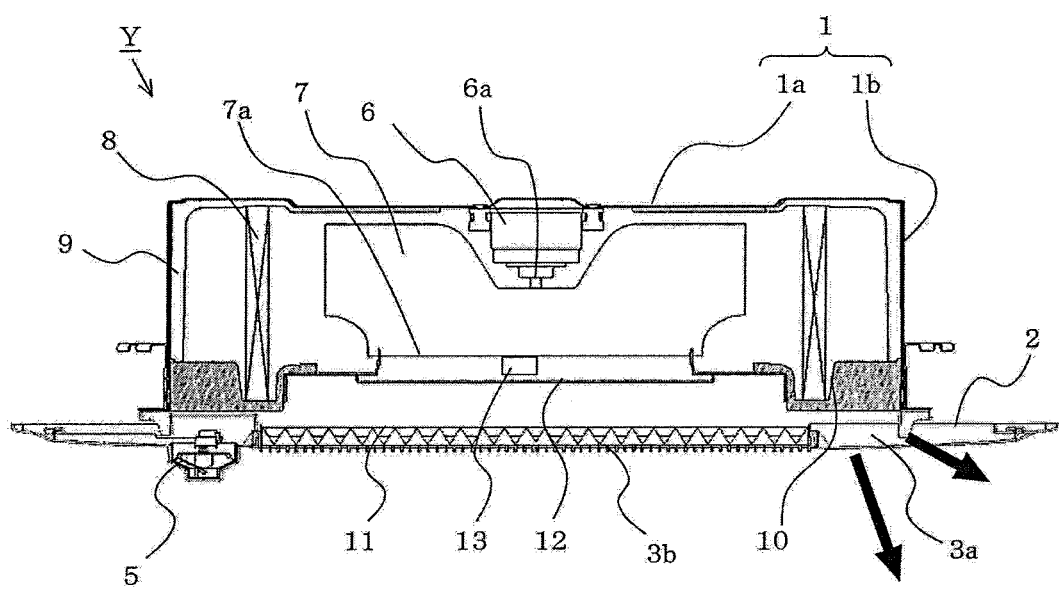
FIG. 3 is a cross-sectional view showing the part (the indoor unit) of the air-conditioning apparatus shown in FIG. 1.
Figure 4:
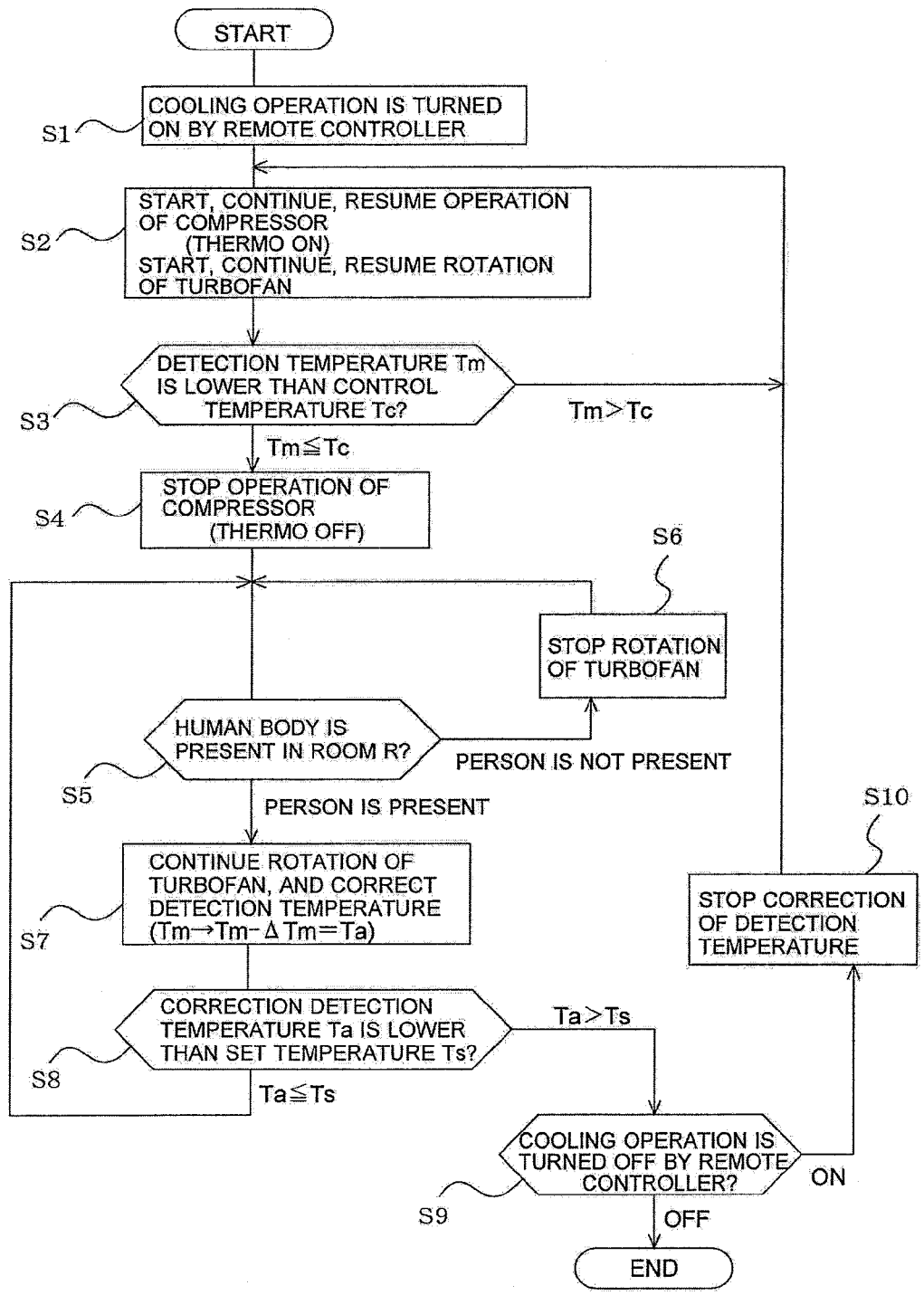
FIG. 4 is a flowchart explaining control of the air-conditioning apparatus shown in FIG. 1.
Figure 5:
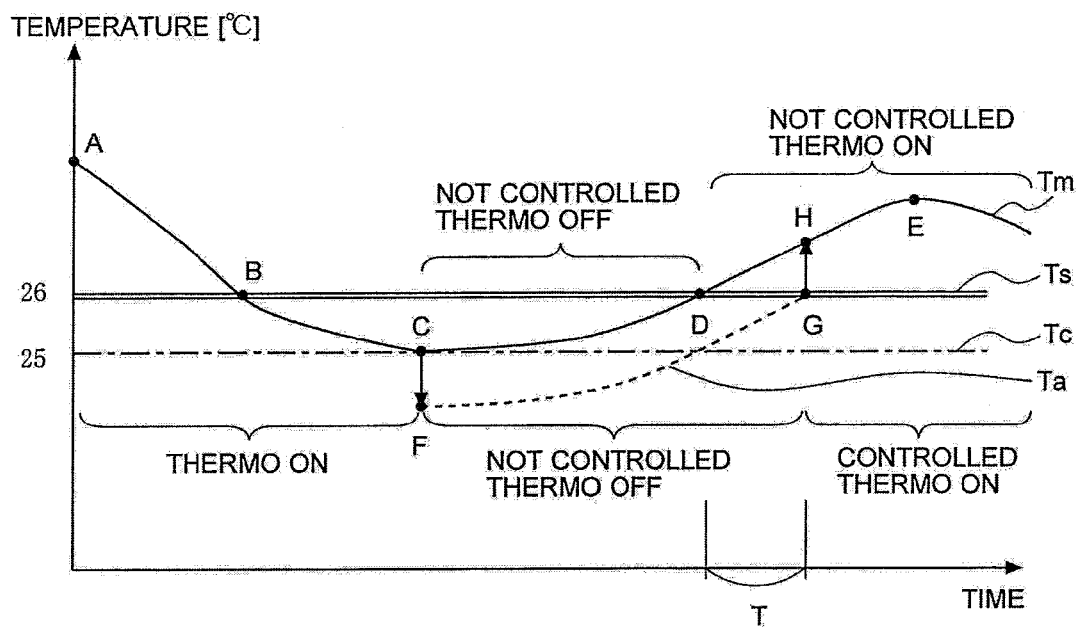
FIG. 5 is a temperature chart for explaining an action of the air-conditioning apparatus shown in FIG. 1.
Figure 6:
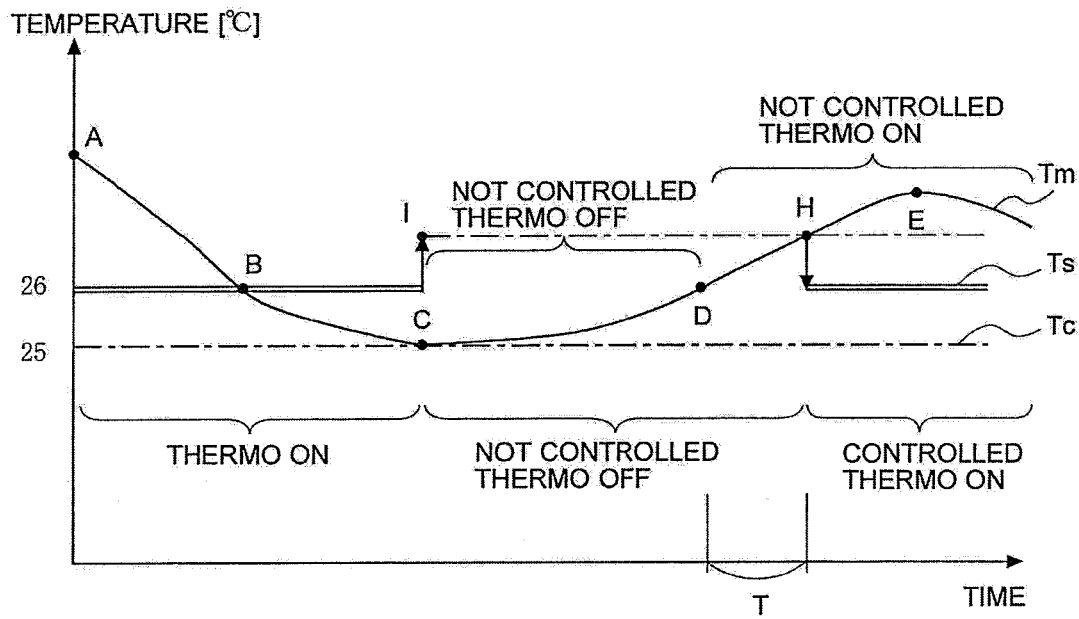
FIG. 6 is a temperature chart for explaining an action of the air-conditioning apparatus shown in FIG. 1.

FIGS. 1 to 6 explain an air-conditioning apparatus according to Embodiment 1 of the present invention. FIG. 1 is a configuration diagram showing a general configuration. FIG. 2 is a perspective view showing a part (an indoor unit). FIG. 3 is a cross-sectional view showing the part (the indoor unit). FIG. 4 is a flowchart explaining control. FIGS. 5 and 6 are temperature charts showing a change in temperature over time for explaining actions. The figures are schematically illustrated, and the present invention is not limited to Embodiment 1 in the figures.

(Air-Conditioning Apparatus)

In FIG. 1, an air-conditioning apparatus 100 includes an outdoor unit X, an indoor unit Y, a remote controller (corresponding to indoor-air temperature setting means) Z, a liquid extension pipe A, a gas extension pipe B, and control means (a controller) C.

The indoor unit Y is installed in a closed space in a building (hereinafter, called "room R").

At this time, the outdoor unit X houses a compressor, an outdoor heat exchanger, and an expansion valve (all not shown) each of which executes a part of a refrigeration cycle. The indoor unit Y houses an indoor heat exchanger that executes part of the refrigeration cycle. The compressor, the outdoor heat exchanger, the expansion valve, and the indoor heat exchanger communicate with each other through refrigerant pipes (the liquid extension pipe A, the gas extension pipe B, and not-illustrated pipes) so that a refrigerant can be circulated.

(Indoor Unit)

In FIG. 2, the indoor unit Y includes a cabinet 1 that is a substantially rectangular-parallelepiped box with a lower surface being open (a bottomed cylinder with a square cross section), and a rectangular face panel 2 that covers the opening (the lower surface) of the cabinet 1. The face panel 2 has an air inlet 3b formed at a center portion, four air outlets 3a in total formed along side edges, and a sensor unit 5 provided at a corner portion. Also, wind-direction flaps 4 are respectively provided at the air outlets 3a. The wind-direction flaps 4 each can control a blow direction in an up-down direction.

In FIG. 3, a fan motor 6 is provided at the center of a top surface 1a of the cabinet 1 such that a rotation shaft 6a faces the lower side. A turbofan (equivalent to an indoor fan) 7 is attached to the rotation shaft 6a.

Also, an indoor heat exchanger 8 is arranged to surround the turbofan 7. An air path is formed outside the indoor heat exchanger 8. An inner cover 9 is arranged inside the top surface 1a and side surfaces 1b of the cabinet 1 to surround the indoor heat exchanger 8. The inner cover 9 provides thermal insulation between the air after the heat exchange and the air outside the unit.

Also, a drain pan 10 is arranged below the indoor heat exchanger 8. The drain pan 10 receives condensed water that is generated when heat is exchanged, and forms the air path. The face panel 2 is provided below the drain pan 10.

More specifically, at the face panel 2, an air filter 11 is arranged at the air inlet 3b (the opening) that communicates with a turbofan air inlet 7a of the turbofan 7. The air filter 11 prevents dusts and the like from entering the unit. The air filter 11 is supported by a grille structure that functions as a blind.

Also, the air outlets 3a formed at the face panel 2 communicate with the air path formed by the inner cover 9 and the drain pan 10.

Further, a bell mouth 12 is arranged between the air filter 11 and the turbofan 7. The bell mouth 12 smoothly introduces the sucked air to the turbofan 7. A sucked-air temperature sensor (equivalent to indoor-air temperature detecting means) 13 is provided near the air inlet 3b.

Also, the sensor unit (correctly, "radiation sensor," described later) 5 can rotate by 360° around an axis in the vertical direction by a motor (not shown).

(Sensor Unit)

The sensor unit 5 includes a sensor motor (not shown), a sensor case that is connected with and rotated by a rotation shaft of the sensor motor, and the radiation sensor (equivalent to human-body presence detecting means) housed in the sensor case. A detection portion of the radiation sensor is exposed to the outside through a detection hole 5b that is formed at a substantially conical protrusion 5a.

The radiation sensor (the human-body presence detecting means) is formed of a plurality of detection portions (not shown). The detection portions are arranged in parallel to the normal to a spherical surface of the substantially conical protrusion 5a. The radiation sensor is, for example, a multiple-eye infrared sensor or a plurality of infrared sensors. The infrared sensor(s) are divided into a plurality of areas.

(Remote Controller)

The remote controller Z (corresponding to the indoor-air temperature setting means) sends signals including a signal for instructing start or stop of the refrigeration cycle, a signal for setting an air-conditioning mode, such as cooling, heating, or drying, a signal for setting a blown-air temperature, and a signal for setting an air-conditioning condition, such as a direction or an air velocity of the blown air, to the indoor unit Y through communication means (with a wire or without a wire).

(Control Means; Controller)

The control means C controls execution of the refrigeration cycle (the compressor) and controls the operation of the turbofan 7, based on a signal from the remote controller Z. In FIG. 1, the control means C is mounted on the outdoor unit X. However, the present invention is not limited to that configuration. The control means C may be mounted on the indoor unit Y. Alternatively, the control means C may be divided into two sections and the two sections may be respectively mounted on the outdoor unit X and the indoor unit Y.

(Operation)

Next, operation of the air-conditioning apparatus 100 is described with reference to FIG. 4.

In FIG. 4, the start of the cooling operation is instructed by the remote controller Z (S1).

Then, the cooling operation (the operation of the compressor and rotation of the turbofan 7) is started and the cooling operation is continued, based on a previously set blown-air temperature (hereinafter, called "set temperature Ts") and an air-conditioning condition, such as a direction or an air velocity of the blown air, or based on an air-conditioning condition such as a new set temperature Ts set by a user through an operation of the remote controller Z (S2).

Further, while the cooling operation is continued, a temperature of the sucked indoor air (hereinafter, called "detection temperature Tm") is detected by the sucked-air temperature sensor 13 and the detection temperature Tm is compared with the set temperature Ts every predetermined time interval (correctly, the detection temperature Tm is compared with a control temperature Tc as described below, S3).

Then, if the detection temperature Tm is a higher temperature than the set temperature Ts, cooling is insufficient, and hence the cooling operation is continued (equivalent to the "thermo ON," the processing returns to S2).

At this time, in order to stabilize the control (to prevent hunting), the cooling operation employs the control temperature Tc (Tc=Ts−ΔTb) that is a lower temperature than the set temperature Ts only by a bias temperature (for example, 1° C.) ΔTb. That is, the compressor is operated until the detection temperature Tm reaches a low temperature that is equal to or lower than the control temperature Tc (Tm>Tc=Ts−ΔTb). The operation frequency of the compressor is decreased as the difference between the control temperature Tc and the detection temperature Tm is smaller, and the operation frequency of the compressor is increased as the difference between the control temperature Tc and the detection temperature Tm is larger by inverter control.

In contrast, if the detection temperature Tm is a low temperature that is equal to or lower than the control temperature Tc (Tm≤Tc=Ts−ΔTb), the cooling is sufficient, and hence the compressor is stopped (equivalent to the "thermo OFF," S4).

Further, it is determined whether the radiation sensor (the human-body presence detecting means) provided at the sensor unit 5 detects presence of a human body in the room R or not (S5).

Then, if a human body is not present in the room R (if the user is not present), the rotation of the turbofan 7 (the fan motor 6) is stopped (S6).

In contrast, if a human body is present in the room R (if the user is present), the rotation of the turbofan 7 (the fan motor 6) is continued, and the value of the detection temperature Tm is corrected to a low temperature only by a temperature correction amount ΔTm (S7). That is, when the detection temperature after the correction is called "correction detection temperature Ta," "Ta=Tm−ΔTm" is established.

Further, the detection temperature Tm is detected by the sucked-air temperature sensor 13, the correction detection temperature Ta is obtained, and the correction detection temperature Ta is compared with the set temperature at Ts every predetermined time interval (S8). At this time, since the determination for the thermo OFF employs the bias temperature ΔTb, the set temperature Ts is used without a change (without a change by the bias temperature) for the determination of the thermo ON.

While the correction detection temperature Ta is a temperature equal to or lower than the set temperature Ts (Ta=Tm−ΔTm≤Ts), as long as a person is present in the room R, the rotation of the turbofan 7 (the fan motor 6) is continued (the processing returns to S5).

That is, since the thermo OFF is executed (since the compressor is stopped), even if the detection temperature Tm is actually higher than the control temperature Tc, the sensible temperature of the human body is decreased when the cooling air is blown on the human body. Accordingly, comfortableness of the user is ensured by sending the air. Also, as described below, since the correction detection temperature Ta is compared with the set temperature Ts and it is determined whether the rotation of the turbofan 7 (the fan motor 6) is continued or not, or in other words, whether the thermo OFF is continued or not (equivalent to whether the thermo ON is resumed or not), the rotation time of the turbofan 7 (the fan motor 6), or the continuation time of the thermo OFF can be increased as compared with a case in which the detection temperature Tm is compared with the set temperature Ts.

In contrast, while the correction detection temperature Ta is a higher temperature than the set temperature Ts (Ta>Ts) in step 8 (S8), the comfortableness of the user cannot be ensured by sending the air. The thermo ON is resumed unless an instruction for turning OFF the cooling operation is emitted by the remote controller (S9). At this time, the control based on the correction detection temperature Ta is stopped, the detection temperature Tm actually detected by the sucked-air temperature sensor 13 is used without a change, the detection temperature Tm is compared with the control temperature Tc (S10), and the operation of the compressor is resumed while the rotation of the turbofan 7 (the fan motor 6) is continued (the processing returns to S2).

If the instruction for stopping (turning OFF) the cooling operation is emitted from the remote controller Z in the step 9 (S9) or in a period from the step 1 to the step 10 (S1 to S10), the cooling operation is stopped (the operation of the compressor and the rotation of the turbofan 7 are stopped).

As described above, even during the thermo OFF, if the person is not present in the room R, the rotation of the turbofan 7 (the fan motor 6) is stopped, and the waste in the power consumption is reduced. Also, since the correction detection temperature Ta is employed, the time of the thermo OFF is extended, and the power consumption by the compressor is reduced.

In the above description, both the determination on the presence of the human body in the room and the employment of the correction detection temperature Ta are executed; however, one of these may be executed.

(Effect Obtained by Correcting Detection Temperature)

FIG. 5 schematically explains an effect obtained by correcting the detection temperature. The vertical axis plots the temperature, and the horizontal axis plots the time. Each temperature in the figure is a mere example, and the present invention is not limited to the temperature.

In FIG. 5, a curve indicated by a solid line is transition of the detection temperature Tm actually detected by the sucked-air temperature sensor 13. That is, when the cooling operation is started (a state "A"), the indoor air is gradually cooled, and the detection temperature Tm decreases. Even if the detection temperature Tm becomes equal to or lower than the set temperature Ts (26° C., a state "B"), until the detection temperature Tm becomes the control temperature Tc (25° C., a state "C"), the cooling operation is continued (equivalent to heat ON).

When the detection temperature Tm becomes the control temperature Tc (25° C., the state "C"), the operation of the compressor is stopped (the operation becomes heat OFF). Then, the cooling of the indoor air is stopped. The detection temperature Tm is gradually increased, and then reaches the set temperature Ts (a state "D"). Further, the detection temperature Tm becomes a higher temperature than the set temperature Ts (a state "H").

Meanwhile, the air-conditioning apparatus 100 according to the present invention executes the above-described operation. That is, when the detection temperature Tm becomes the control temperature Tc (25° C., the state "C"), the operation of the compressor is stopped (the operation becomes the heat OFF), the detection temperature Tm is corrected, and hence the detection temperature Tm is read as the correction detection temperature Ta obtained by correcting the detection temperature Tm to a low temperature only by the temperature correction amount ΔTm (for example, 1° C.) (an imaginary state "F").

Then, the correction detection temperature Ta has an imaginary curve that is deviated from the actual detection temperature Tm to the low-temperature side by the temperature correction amount ΔTm as indicated by a broken line and that is gradually increased. The correction detection temperature Ta reaches the set temperature Is soon (an imaginary state "G"). At this time, the operation of the compressor is resumed (the operation becomes the heat ON).

That is, since the temperature correction amount ΔTm is employed, the operation of the compressor is resumed not in the state "D" in which the actual detection temperature Tm reaches the set temperature Ts, but in the state "H" in which the actual detection temperature Tm is high only by the temperature correction amount ΔTm. Hence, an operation stop time (a thermo OFF time) of the compressor is extended by a time T from the state "D" to the imaginary state "G" as compared with a case in which the temperature correction amount ΔTm is not employed and the operation of the compressor is resumed when the state becomes the state "D" in which the actual detection temperature Tm reaches the set temperature Ts.

Accordingly, the power consumption of the compressor corresponding to the extended time T is reduced.

In the state "H," the operation of the compressor is resumed. The actual detection temperature Tm is slightly increased by thermal inertia to a state "E" immediately after the operation of the compressor is resumed. However, the detection temperature Tm is then gradually decreased.

(Temperature Correction Amount)

The temperature correction amount ΔTm is determined with reference to the sensible temperature.

That is, if an air flow exists in the room, a sensible temperature Tf (° C.) that the human body feels does not correspond to the actual indoor-air temperature (equivalent to the detection temperature Tm (° C.)), but is deviated to a low temperature by a value obtained by multiplying the square root of an air velocity V (m/s) of the air flow that reaches the human body by a correction coefficient α (for example, 2 or 4) (Tf=Tm−α·√V).

Accordingly, if the air velocity V (m/s) at which the air reaches the human body is high, even when the detection temperature Tm is higher than the set temperature Ts or the control temperature Tc, the sensible temperature Tf becomes lower than the set temperature Ts or the control temperature Tc. That is, since the control of blowing the air on the human body and decreasing the sensible temperature is performed, the comfortable sensible temperature Tf can be ensured, and the comfortableness can be maintained.

That is, if the air velocity V (m/s) at which the air reaches the human body (hereinafter, called "reach air velocity") is high, the temperature correction amount ΔTm preferably takes a large value, so that the operation stop time (the thermo OFF time) of the compressor is further extended. In contrast, if the air velocity V (m/s) at which the air reaches the human body is low, the temperature correction amount ΔTm preferably takes a small value, so that the comfortableness is ensured.

If the distance between the human body present in the room R and the indoor unit Y cannot be measured, the temperature correction amount ΔTm may be a constant value (for example, 1° C.), or a value substantially proportional to the rotation speed of the turbofan 7 (for example, a value variable in a range from 0° C. to 2° C.).

Further, if a function that can measure the distance between the human body present in the room R and the indoor unit Y is added to the sensor unit 5 (the radiation sensor) and hence the distance between both the human body and the indoor unit Y can be known, as the distance between both the human body and the indoor unit Y decreases, and as the rotation speed of the turbofan 7 increases (as the velocity of the blown air is increased (becomes high wind), the reach air velocity V is increased. Therefore, the value of the temperature correction amount ΔTm may be increased. When a plurality of human bodies are present in the room R, it is preferable to use the distance to the farthermost human body so that the comfortableness of the furthermost person is focused. Table 1 shows an example.

TABLE 1

| Air velocity | Distance | | |
| --- | --- | --- | --- |
| | 0 to 2 m | 2 to 4 m | 4 to 6 m |
| High | −2.0 | −1.5 | −1.0 |
| Medium | −1.5 | −1.0 | −0.5 |
| Low | −1.0 | −0.5 | 0.0 |

In Table 1, if the rotation speed of the turbofan 7 is large (equivalent to the "high wind"), reach wind velocities (m/s) at positions of 2 m, 4 m, and 6 m from the indoor unit Y are respectively 1.00 (m/s), 0.56 (m/s), and 0.25 (m/s). If the correction coefficient α is "2," the temperature correction amounts ΔTm at the positions of 2 m, 4 m, and 6 m from the indoor unit Y can be respectively rounded off to 2.0° C., 1.5° C., and 1.0° C. At this time, the correction coefficient is "2" because correction may be excessive if the correction coefficient is "4."

Similarly, if the rotation speed of the turbofan 7 is around medium (equivalent to "medium wind"), temperature correction amounts ΔTm at the positions of 2 m, 4 m, and 6 m from the indoor unit Y can be respectively rounded off to 1.50° C., 1.0° C., and 0.50° C. Further, if the rotation speed of the turbofan 7 is small (equivalent to "low wind"), temperature correction amounts ΔTm at the positions of 2 m, 4 m, and 6 m from the indoor unit Y can be respectively rounded off to 1.0° C., 0.5° C., and 0.0° C.

(Effect Obtained by Correcting Set Temperature)

FIG. 6 schematically explains an effect obtained by correcting the set temperature instead of the effect obtained by correcting the detection temperature as described above with reference to FIG. 5. The vertical axis plots the temperature, and the horizontal axis plots the time. The same state as or a state corresponding to that in FIG. 5 uses the same reference sign, and the description is partly omitted.

In FIG. 6, when the detection temperature Tm becomes the control temperature Tc (25° C., the state "C"), the operation of the compressor is stopped (the operation becomes the heat OFF). Then, since the cooling of the indoor air is stopped, the detection temperature Tm is gradually increased.

At this time, the set temperature Ts is corrected, and the set temperature Ts is read as a set temperature that is corrected to a high temperature only by a temperature correction amount ΔTs (for example, 1° C.) (an imaginary state "I").

Then, the corrected set temperature Is becomes a straight line that is deviated to the high-temperature side from the initially set temperature initially set temperature Ts only by the temperature correction amount ΔTs as indicated by a two-dot chain line. Then, the actual detection temperature Tm exceeds the initially set temperature Ts (the state "D"), and reaches the corrected set temperature Ts (the imaginary state "H"). At this time, the operation of the compressor is resumed (the operation becomes the heat ON).

Thus, similarly to the case in which the detection temperature Tm is corrected (see FIG. 5), since the operation of the compressor is resumed not in the state "D" in which the actual detection temperature Tm reaches the initially set temperature Ts, but in the state "H" in which the actual detection temperature Tm is high only by the temperature correction amount ΔTs, the operation stop time of the compressor (the thermo OFF time) is extended only for the time T from the state "D" to the imaginary state "H."

Accordingly, the power consumption of the compressor corresponding to the extended time T is reduced.

If the operation of the compressor is resumed in the state "H," the correction for the set temperature is stopped, and the set temperature is restored to the initially set temperature.

REFERENCE SIGNS LIST

1: cabinet 1a: top surface 1b: side surface 2: face panel 3a: air outlet 3b: air inlet 4: wind-direction flap 5: sensor unit 5a: substantially conical protrusion 5b: detection hole 6: fan motor 6a: rotation shaft 7: turbofan 7a: turbofan air inlet 8: indoor heat exchanger 9: inner cover 10: drain pan 11: air filter 12: bell mouth 13: sucked-air temperature sensor 100: air-conditioning apparatus A: liquid extension pipe B: gas extension pipe C: control means R: room X: outdoor unit Y: indoor unit Z: remote controller Ta: correction detection temperature Tc: control temperature Tf: sensible temperature Tm: detection temperature Ts: set temperature ΔTm: temperature correction amount ΔTb: bias temperature ΔTs: temperature correction amount α: correction coefficient

What is claimed is:

1. An air-conditioning apparatus, comprising:
   an outdoor unit housing a compressor, an outdoor heat exchanger, and an expansion valve each of which executes a part of a refrigeration cycle;
   an indoor unit housing an indoor heat exchanger that execute part of the refrigeration cycle;
   an indoor fan housed in the indoor unit, the indoor fan sucking indoor air that is air in a room in which the indoor unit is installed and supplying the indoor air to the indoor heat exchanger, and blowing the indoor air that has passed through the indoor heat exchanger into the room;
   an indoor-air temperature detector configured to detect a temperature of the indoor air;
   a human-body presence detector configured to detect presence of a human body in the room;
   an indoor-air temperature setting device configured to be operated to set a temperature of the indoor air; and
   a controller configured to control the refrigeration cycle and the indoor fan, based on a detection temperature that is the temperature of the indoor air detected by the indoor-air temperature detector, human-body information detected by the human-body presence detector, and a set temperature that is the temperature of the indoor air set by the indoor-air temperature setting device, wherein
   when the indoor heat exchanger functions as an evaporator, the controller stops the refrigeration cycle if the detection temperature is lower than the set temperature, and stops the indoor fan if the human-body information indicates that the human body is not present, and operates the indoor fan if the human-body information indicates that the human body is present, and
   when the refrigeration cycle is stopped because the detection temperature is lower than the set temperature and the indoor fan is operated because the human-body information indicates that the human body is present, the controller corrects the detection temperature to be lower only by a predetermined temperature correction amount, and when a correction detection temperature that is the corrected detection temperature becomes higher than the set temperature, the controller resumes operation of the refrigeration cycle.

2. The air-conditioning apparatus of claim 1, wherein the controller increases the temperature correction amount as a blow velocity of the indoor air blown from the indoor fan is higher.

3. The air-conditioning apparatus of claim 1, wherein
   the human-body presence detector can detect a distance between the human body in the room and the indoor unit, and
   the controller decreases the temperature correction amount as the distance between the human body in the room detected by the human-body presence detector and the indoor unit becomes larger.

4. The air-conditioning apparatus of claim 1, wherein
   the indoor unit includes a wind-direction flap that can change a direction of the indoor air blown from the indoor fan, and
   the controller swings the wind-direction flap in both or one of an up-down direction and a left-right direction while the indoor fan is operated.

* * * * *